United States Patent
Gorin et al.

(10) Patent No.: US 9,812,811 B1
(45) Date of Patent: Nov. 7, 2017

(54) CONNECTOR HOUSING MOUNTED ON A WALL SOCKET BY MEANS OF AN ADAPER PLATE

(71) Applicants: Thomas Michael Gorin, Atlanta, GA (US); James Loye Hutchinson, Dallas, GA (US); Cassidy Amber Jones, Mableton, GA (US); Jeremy Sabri Omess, Sandy Springs, GA (US); Nicolas Juan Nuñez, Suwanee, GA (US); Hagan Seth McBride, Duluth, GA (US)

(72) Inventors: Thomas Michael Gorin, Atlanta, GA (US); James Loye Hutchinson, Dallas, GA (US); Cassidy Amber Jones, Mableton, GA (US); Jeremy Sabri Omess, Sandy Springs, GA (US); Nicolas Juan Nuñez, Suwanee, GA (US); Hagan Seth McBride, Duluth, GA (US)

(73) Assignee: DATA:)COMM ELECTRONICS, INC., Norcross, GA (US)

( * ) Notice: Subject to any disclaimer, the term of this patent is extended or adjusted under 35 U.S.C. 154(b) by 0 days.

(21) Appl. No.: 15/206,544

(22) Filed: Jul. 11, 2016

(51) Int. Cl.
| | |
|---|---|
| H01R 25/00 | (2006.01) |
| H01R 27/02 | (2006.01) |
| H01R 31/00 | (2006.01) |
| H01R 33/00 | (2006.01) |
| H01R 13/60 | (2006.01) |
| H01R 24/70 | (2011.01) |
| H01R 31/06 | (2006.01) |
| H02J 7/00 | (2006.01) |
| H01R 103/00 | (2006.01) |

(52) U.S. Cl.
CPC ............ H01R 13/60 (2013.01); H01R 24/70 (2013.01); H01R 25/00 (2013.01); H01R 31/06 (2013.01); H01R 31/065 (2013.01); H02J 7/0044 (2013.01); *H01R 2103/00* (2013.01)

(58) Field of Classification Search
CPC ........ H01R 13/60; H01R 13/62; H01R 13/72; H01R 24/70; H01R 24/54; H01R 25/00; H01R 25/006; H01R 27/00; H01R 31/06; H01R 31/065
USPC ................ 439/300, 501, 535, 536, 628, 638
See application file for complete search history.

(56) References Cited

U.S. PATENT DOCUMENTS

| 5,625,271 A * | 4/1997 | Shapiro .................. H01M 10/46 320/112 |
| 5,998,964 A * | 12/1999 | Martensson .......... H02J 7/0045 320/107 |
| 6,551,125 B2 * | 4/2003 | Ikeda .................. H01R 13/5833 439/450 |

(Continued)

*Primary Examiner* — Chandrika Prasad
(74) *Attorney, Agent, or Firm* — Thomas | Horstemeyer, LLP

(57) ABSTRACT

A retractable wall mounted electrical connector assembly is mounted to an existing electrical wall socket for charging a battery of a hand held device, and includes an adapter plate with adapter openings for alignment with the support openings of the wall socket, and a perimeter support rim. The cord housing includes a perimeter mating rim that fits with the perimeter support rim of the adapter plate, and a lock for connecting the perimeter mating rim of the cord housing to the perimeter support rim of the adapter plate.

11 Claims, 5 Drawing Sheets

(56) References Cited

U.S. PATENT DOCUMENTS

| | | | | |
|---|---|---|---|---|
| 6,861,822 B2* | 3/2005 | Wei | ............. | H01R 13/60 |
| | | | | 320/111 |
| 7,755,323 B2* | 7/2010 | Wu | ............. | H01M 10/425 |
| | | | | 320/103 |
| 8,384,241 B2* | 2/2013 | Chen | ............. | H01R 31/065 |
| | | | | 307/11 |
| 8,414,318 B1* | 4/2013 | Chen | ............. | H01R 35/04 |
| | | | | 439/173 |
| 8,415,920 B2* | 4/2013 | Liao | ............. | H01R 31/065 |
| | | | | 16/225 |
| 9,161,464 B2* | 10/2015 | Liao | ............. | H05K 5/0065 |
| 2004/0121648 A1* | 6/2004 | Voros | ............. | H01R 13/6215 |
| | | | | 439/535 |
| 2004/0251873 A1* | 12/2004 | Simoes | ............. | H02J 7/0044 |
| | | | | 320/114 |
| 2011/0084651 A1* | 4/2011 | Caskey | ............. | H01R 25/006 |
| | | | | 320/107 |
| 2014/0306661 A1 | 10/2014 | Rosenblum et al. | | |

* cited by examiner

CONNECTOR HOUSING MOUNTED ON A WALL SOCKET BY MEANS OF AN ADAPER PLATE

BACKGROUND OF THE INVENTION

Portable hand held communication devices are powered by batteries and the power of the battery depletes over time from use by its users. The hand held devices usually have an access port or "jack" for receiving a charging connector. An insulated power cord has a connector at one end for connection to the port of the hand held device and a conventional wall connector at its other end for connection to the conventional electrical wall socket of a dwelling.

While this arrangement seems to be convenient and useful, there are problems usually associated with the conventional power cords since the user of such a cord would likely want to move it to other locations, such as in different rooms of a house, a business or from one house to another, etc., or to a vehicle. A result is that the rechargeable power cord is likely to be misplaced and "lost," temporarily or permanently unavailable to its owner. While this problem can be solved by maintaining the power cord plugged in at a single outlet and never moving it, there likely will be exceptions to the effort to maintain the power cord in a single location.

The lost power cord is likely to cause substantial frustration to the owner and other users of the power cord, and in many situations the owner of the missing power cord is likely to purchase a substitute power cord.

Another undesirable feature of the power cords described above is that the insulated power cord usually has a length of about three feet and when the cord is not connected to the communication device it extends from its wall connector out onto a counter top, desk top or other horizontal surfaces and it presents an undesirable cluttered appearance.

For these and other reasons it would be desirable to have a "docking station" for a communication power cord that is neat in appearance, is in a fixed position when in use but can be relocated to other outlets, and is conveniently used for the purpose of charging hand held communication devices and other devices that have a connector receptacle used for recharging.

SUMMARY OF THE INVENTION

Briefly described, the present invention concerns a wall-mounted electrical connector assembly for charging a battery of a portable device, such as a battery in a hand held communication device. The electrical connector assembly may be mounted to a conventional electrical wall socket such as the type that includes a socket support plate mounted in a hollow wall. A typical hollow wall socket has upper and lower electrical receptacles mounted to a socket support plate, and "rabbit ears" extending from opposite ends of the socket support plate that define mounting openings for screws that fasten the wall socket to the internal wall of a building structure, and an opening positioned between the rabbit ear openings, such as shown in FIGS. 1-4.

An adapter plate is to be provided for mounting a cord housing or other type of housing to the surface of a wall structure. The adapter plate may be designed for the prior art sockets, such as the conventional dual sockets or the dual décor sockets.

A cord housing that accommodates an electrical cord leading to the connector is mounted to the adapter plate.

A feature of the invention is that the adapter plates of both types of sockets have openings extending there through that align with the openings between the ears of the rabbit ears of the electrical wall socket support plate so that a conventional screw or other type fastener can securely mount the adapter plate in its position against the wall socket. The adapter plates may include large central openings that expose the connector receptacles of the wall socket for receiving the blades of a conventional connector.

After the adapter plate has been mounted to the electrical wall socket support plate, the cord housing may be mounted to the adapter plate. The cord housing may include the retractable cord, and the cord housing has a perimeter mating rim that extends about the adapter plate and toward the surface of the exterior of the wall.

A lock is formed to securely fasten the cord housing to the adapter plate, with a simple means for mounting the cord housing to the adapter plate and releasing the cord housing from the adapter plate.

An advantage of the invention is that it may include a connector mounted at the distal end of an extendable cord, and the internal end of the cord that reaches through the opening of the adapter plate and is connected to an electrical circuit, thereby providing the electrical charge for the external plug that is to be received in the receptacle of the hand held battery charged device.

Another feature of the invention is that both the adapter plate and the cord housing may have perimeter rims so that one perimeter rim is supported by the other perimeter rim. A lock pin and lock opening arrangement may be used for securely holding the cord housing and the adapter plate in connection with each other. Further, the simple lock pin opening through the perimeter mating rim of the cord housing that receives the lock pin allows a person to insert a pointed instrument, such as the pointed end of a mechanical pencil, through the lock pin opening to press and push the lock pin out from the lock opening to release the cord housing from the adapter plate.

The cord housing may contain a conventional reel that is biased to retract the cord toward the housing. A recess is formed in the cord housing to receive the connector at the terminal end of the cord.

Others objects, features, and advantages of the present invention will become apparent upon reading the following specification when taken in conjunction with the accompanying drawings.

DETAILED DESCRIPTION

Figure 1:
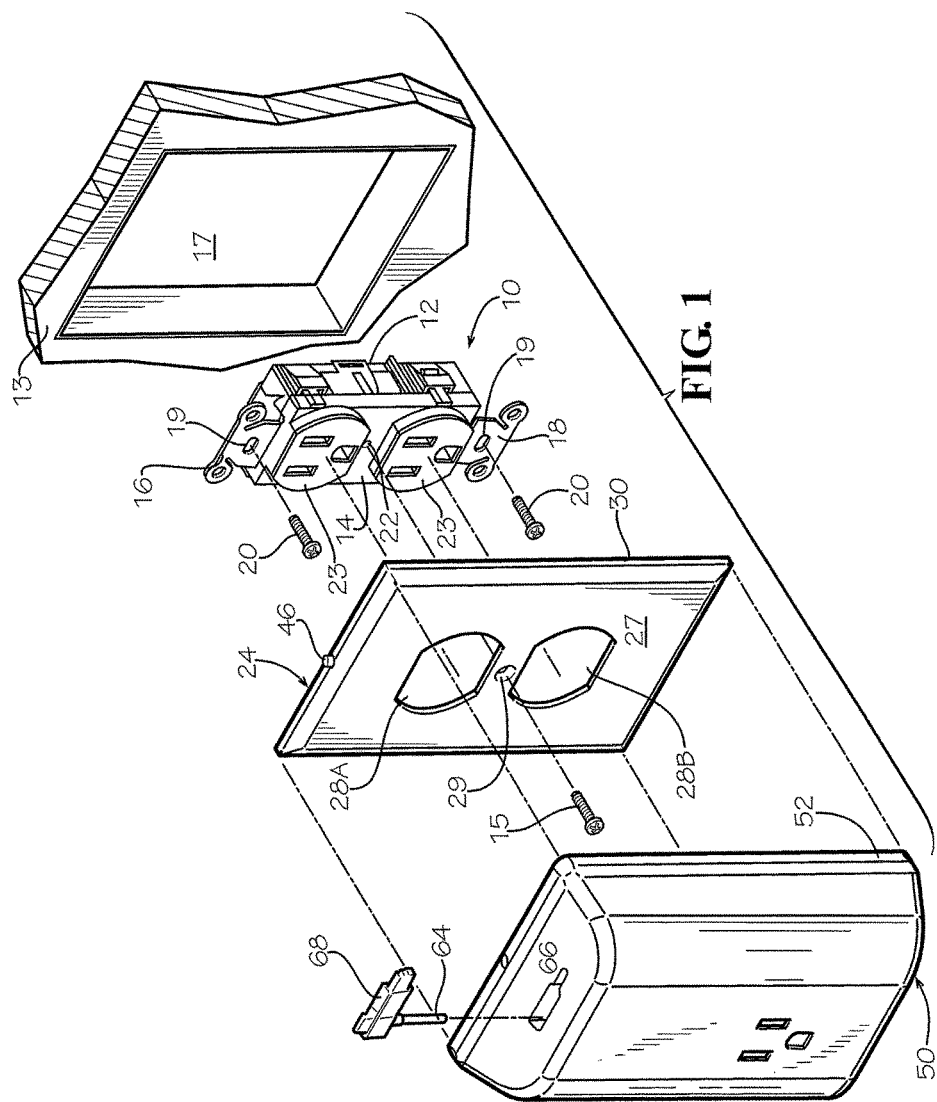
FIG. 1 is an expanded, perspective view of a conventional electrical wall socket, and an electrical connector assembly that includes an adapter plate that is to be placed about the electrical wall socket, a cord housing that is to be telescopically received about the adapter plate, and the retractable cord and connector that are to be used to charge a device.

Referring now in more detail to the drawings, in which like numerals indicate like parts throughout the several views, FIG. 1 illustrates a conventional dual wall socket 10 that is to be mounted in an opening 17 in a hollow wall 13. The wall socket 10 includes a support plate 12 that has a central portion 14, upper and lower distal ends that are in the form of a pair of "rabbit ears" 16 and 18, and openings 19 are formed in each of the rabbit ears between and centrally of the rabbit ears for the insertion of fasteners such as wood screws 20 that rigidly mount the electrical wall socket and its electrical box to an adjacent hollow wall structure 13 of a building. Central mounting opening 22 is positioned in the central portion 14 of the socket support plate, between the electrical sockets 23.

The wall socket 10 is to be mounted in the wall opening 17 of the hollow wall 13, usually in a junction box (not shown) mounted in the hollow wall. This is conventional in the art.

As shown in FIG. 1, an adapter plate 24 and a cord housing 50 are to be mounted in alignment with each other and in alignment with the conventional dual wall socket 10 and the wall opening 17.

Figure 2:
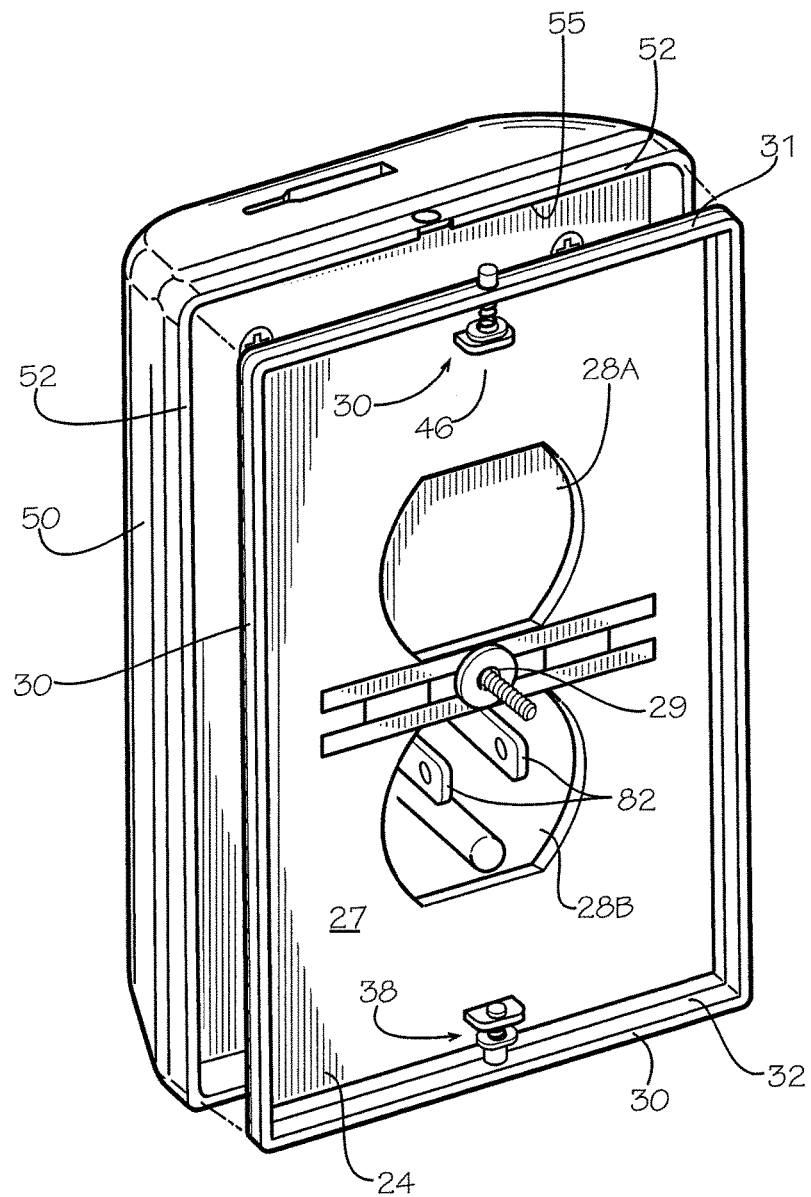
FIG. 2 is a perspective view of the back of the adapter plate shown spaced from the cord housing, showing the inside components of the adapter plate, the openings that fit about conventional electrical plugs and its blades, and the locks for connecting the cord housing to the adapter plate.

As shown in FIGS. 1 and 2, the adapter plate 24 includes a flat central panel 27 that includes dual openings 28A and 28B for registering with the electrical sockets 23 of the conventional style receptacles and a central screw opening 29.

Figure 3:
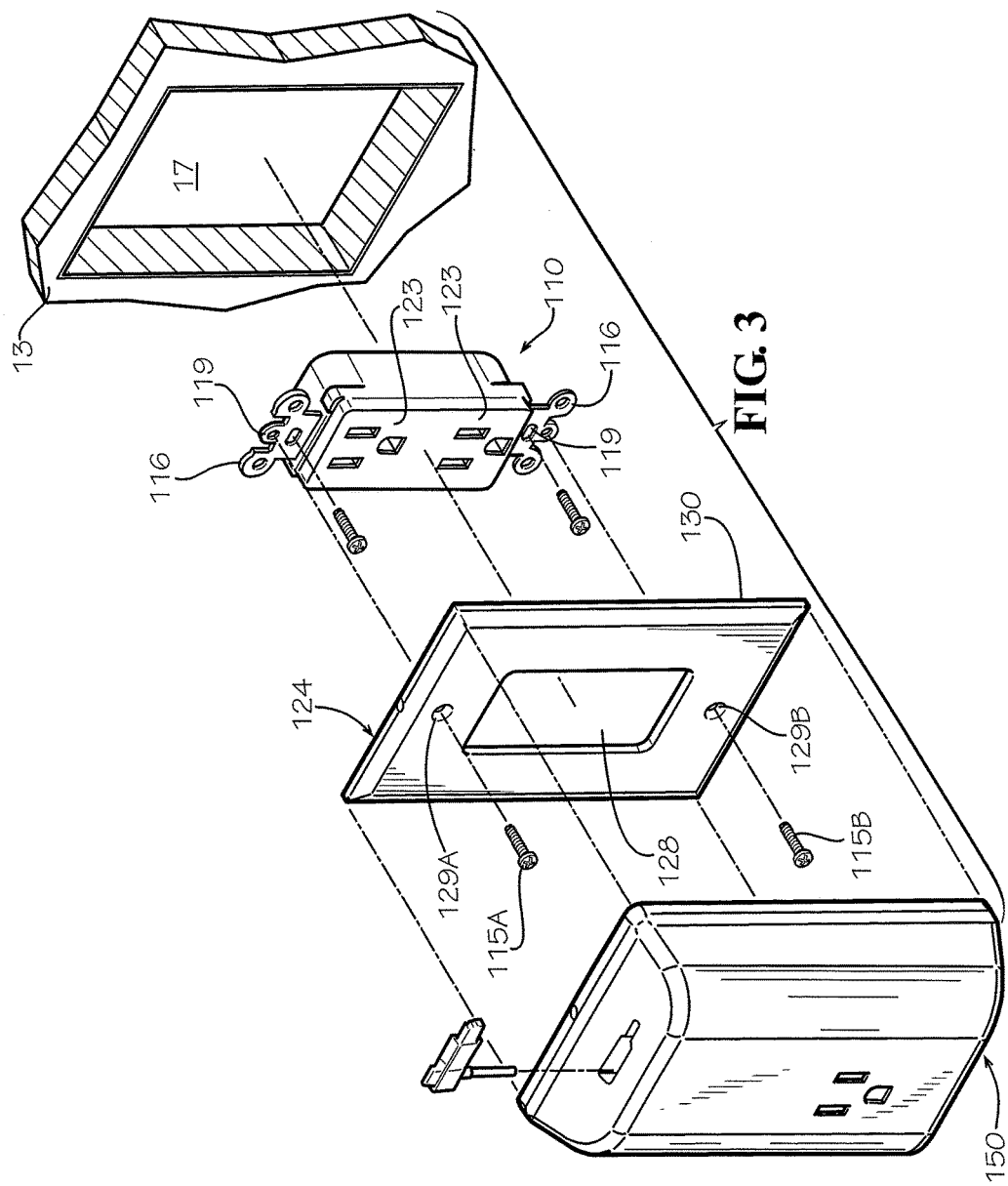
FIG. 3 is an expanded perspective view, similar to FIG. 1 but showing the invention mounted about a décor dual plug, and its retractable cord and connector.
Figure 4:
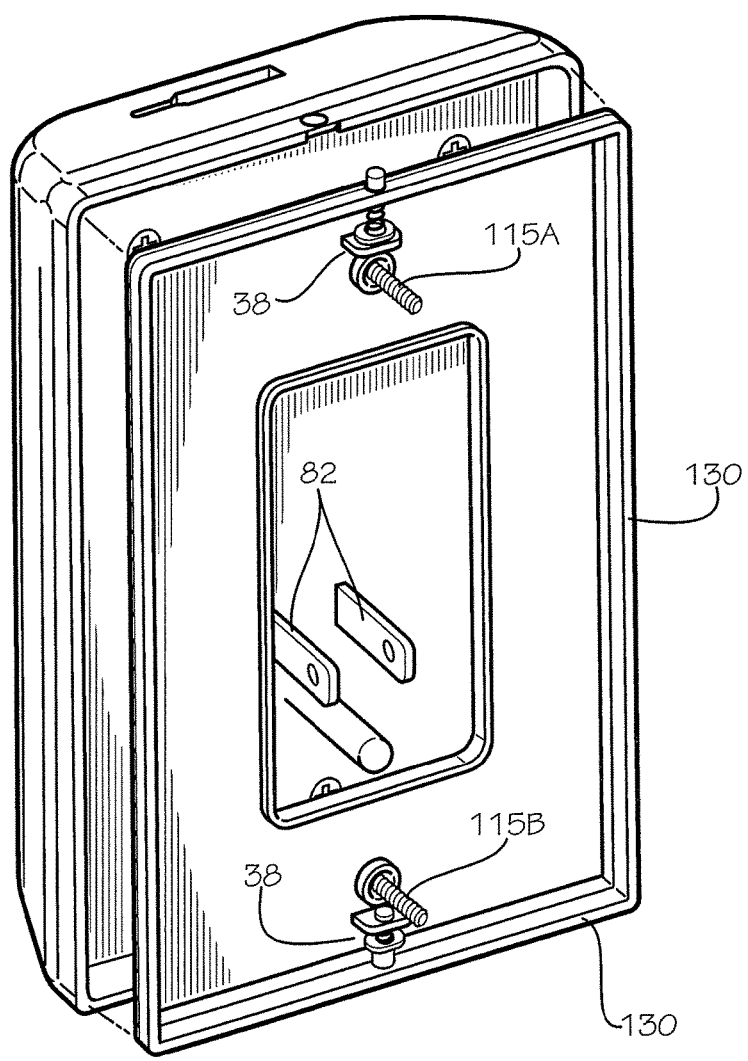
FIG. 4 is an expanded perspective view, similar to FIG. 2, but showing an adapter plate that is shaped to fit about a décor wall socket.

FIGS. 3 and 4 illustrate a decora' electrical wall socket 110 and how a decora' adapter plate 124 can fit about the rectangular body of the socket. The decora' wall socket 110 includes rabbit ears 116 at opposite ends and the decora' adapter plate has a rectangular opening 128 that is sized and shaped to fit about the body of the decora' wall socket 110 and its electrical sockets 123 and its rabbit ears. The large rectangular central opening 128 in the decora' adapter plate 124 is sized to extend about the rectangular shape of the wall socket and about both of the electrical sockets 123, and the fastener openings 129A and 129B of the adapter plate are vertically spaced above and below the opening 128 for decora' style receptacles. Screws 115A and 115B may be used to extend through the fastener openings 129A and 129B of the adapter plate 124 and to the support openings 119 of the rabbit ears of the socket support plate 123 to securely mount the adapter plate to the socket support plate.

Adapter plate 24 of FIGS. 1 and 2 and adapter plate 124 of FIGS. 3 and 4 each include a perimeter rim 30 and 130, respectively, that extends about its central panel for bearing against the hollow wall 13 and facing toward the wall opening 17 and toward the electrical wall socket. The perimeter rims of both of the adapter plates may be of a dimension to extend around the electrical wall socket 10 and 110, respectively. The perimeter rims 30 and 130 of both adapter plates of the electrical sockets and the perimeter rims of both cord housings 50 and 150 are similar in size, shape and function. The perimeter rims may include opposed top and bottom rims and opposed side rims that may form a continuous rim about the adapter plate.

As shown in FIGS. 1 and 2, the cord housing 50 also includes a perimeter mating rim 52 that is sized and shaped to telescopically mount about the perimeter rim 30 of the adapter plate 24, as shown by the dash lines extending between the cord housing 50 and the adapter plate 24. Preferably, the dimensions of the perimeter mating rim 52 of the cord housing 50 and the rim 30 of the adapter plate 24 make a snug relationship with respect to each other, with the perimeter mating rim 52 of the cord housing 50 surrounding the rim of the adapter plate 24, with both rims facing toward engagement with the surface of the hollow wall 13 of the building. The snug fit between the two may be made because of their complementary dimensions.

Figure 5:
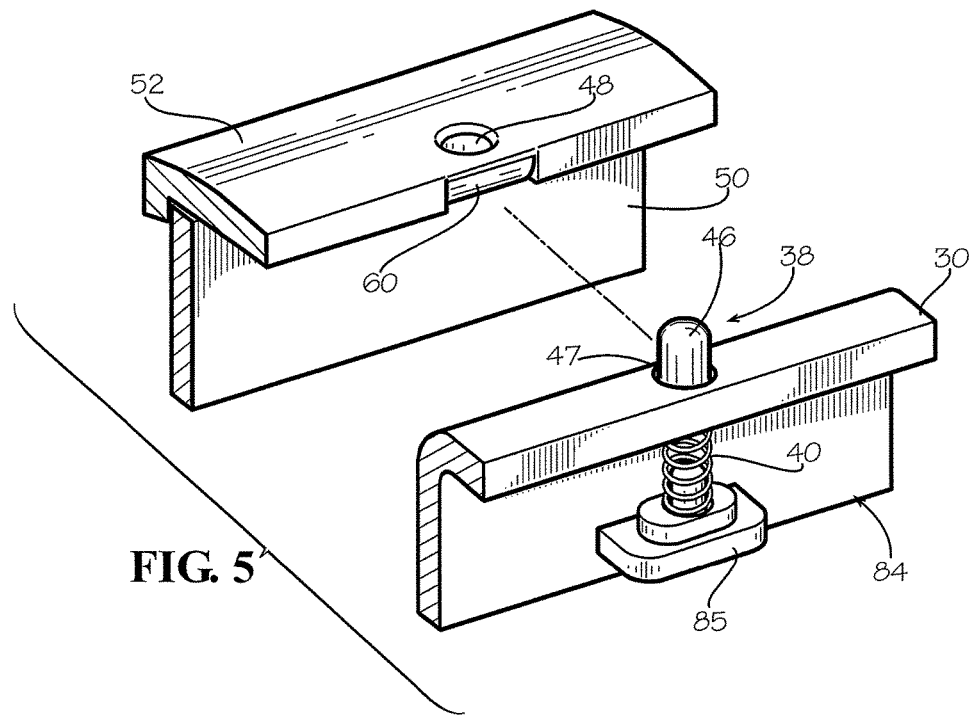
FIG. 5 shows how the top flange of the cord housing is moved toward the top flange of the adapter plate with the lock opening of the cord housing to receive the lock pin and releasably lock them together.
Figures 6, 7:
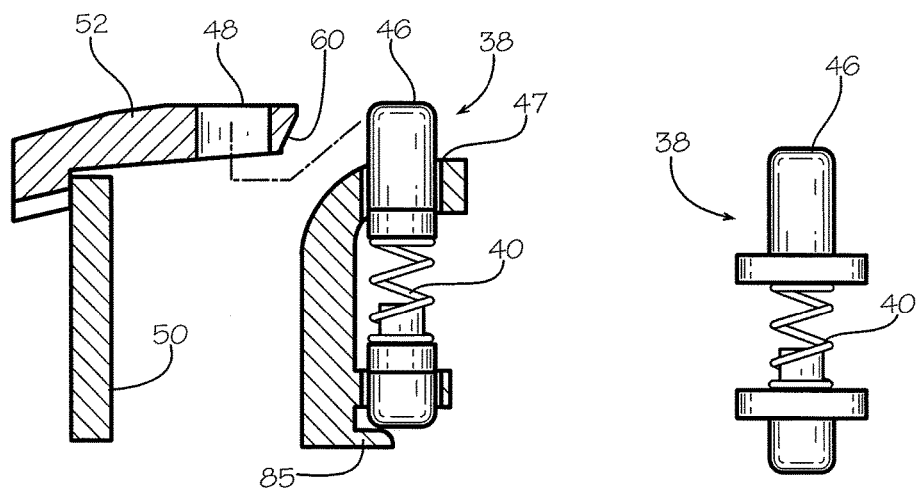
FIG. 6 is a side view of the lock pin.
FIG. 7 is a side cross sectional view of the lock pin opening, showing how the lock pin retracts as it is moved into the lock pin opening.

As shown in FIGS. 4-7, one or more rim locks 38 may be mounted in the rims of the adapter plates 24 and 124 for connecting the perimeter mating rim 52 of the cord housing 50 to the perimeter rim of the adapter plate. In a preferred embodiment of the invention, the rim locks 38 may be mounted in the perimeter rim 30, 130 of the adapter plates, such as in opposing top and bottom rims 31 and 32 of FIG. 2. For example, as illustrated in FIGS. 2 and 6, the rim locks 38 may include springs 40 that are supported adjacent the interior surfaces of the opposed rims by a shelf 85. The springs 40 of the rim locks are biased toward a perimeter rim of the adapter plate 24, in alignment with the rim lock opening 48.

The rim locks include a lock pin 46 that is mounted on the spring 40 to protrude through a lock opening 47 formed in the rim wall of the adapter plate 24. The dome shaped lock pin 46 is sized and shaped to slidably pass through the lock pin opening 47 of the perimeter rim 30, and are of a length to extend through and beyond the surface of the perimeter mating rim 52 of the adapter plate, protruding upwardly and downwardly as generally shown in the upper and lower rims 31 and 32 of FIG. 2. The lock pins protrude beyond their rims of the adapter plate for extending into the lock pin openings 48 of the cord housing 50. This locks the cord housing 50-150 to its adapter plate.

The lock pin opening 48 in the perimeter mating rim 52 of the cord housing 50 of FIG. 2 becomes aligned with the lock pin 46 and is sized and shaped to slidably receive the lock pin when the cord housing 50 is telescopically mounted about the adapter plate 24. The lock pin is pushed by its spring into the lock pin opening 48.

Preferably, the dimensions of the rims of the cord housing 50 and the adapter plate 24 make a sliding relationship with respect to each other, with the mating rim of the cord housing surrounding the perimeter rim of the adapter plate so that when the cord housing 50 is to be mounted about the adapter plate 24, a snug and secure fit between the two is made because of their common dimensions.

As shown in FIGS. 5 and 6, a beveled edge 60 is formed in the central portion of the top perimeter mating rim 52 and a similar beveled edge may be formed in the central portion of the lower perimeter mating rim. The beveled edges are sloped so that as its lock pin moves toward its lock opening 48, the beveled edge applies a downward force to the moving lock pin 46, causing the lock pin to temporarily retract against the bias of its spring 40, sliding through the beveled edge until it is aligned with the opening 48, whereupon the spring 40 pushes the lock pin 46 up through the lock pin opening 48.

This lock pin arrangement of FIGS. 5-7 may be duplicated at both the top and bottom of the perimeter rims of the adapter plate wall so that both the upper and lower end portions of the adapter plate 24 will be securely retained at the edge of the perimeter mating rim of the cord housing 50. Likewise, the lock pin arrangement of FIGS. 5-7 may be used on the opposed sidewalls of the perimeter rim of the adapter plate and the cord housing, if desired.

When it is desired to remove the cord housing 50 from the adapter plate 24, a person may use a pointed instrument, such as a mechanical pencil (not shown), to push the lock pin 46 back through its lock opening as shown in FIG. 6, and pull the cord housing away from the adapter plate.

It will be noted that the depth of the adapter plate 24 is considerably smaller than the depth of the cord housing 50, as shown in FIGS. 1 and 2. This leaves a significant interior space (not shown) within the cord housing to accommodate the reel, spring, and cord of the electrical charge device that are positioned therein.

As shown in FIG. 1, the insulated electrical conductor cord 64 may be pulled progressively from the cord housing 50 with the cord to extend from cord housing through a shaped recess 66. The connector 68 at the distal end of the cord 64 is to be plugged into the hand held device. When the battery of the hand held device has been charged, the connector assembly is removed from the device and the cord and connector are moved back to the cord housing, with the connector fitting into the shaped recess 66 in the cord housing.

As shown in FIGS. 2 and 4, an electrical plug has its blades 82 extending from the cord housing 50 through the openings in the adapter plate and toward an electrical socket 23 for electrically connecting the cord 64 to a power supply.

Although preferred embodiments of the invention have been disclosed in detail herein, variations and modifications of the disclosed embodiment can be made without departing from the spirit and scope of the invention as set forth in the following claims.

The invention claimed is:

1. An electrical connector assembly for mounting on an electrical wall socket for charging a battery of a hand held device, comprising
 a cord housing, an insulated electrical cord in the cord housing, an external connector connected to the insulated electrical cord for connecting the insulated electrical cord to the battery of the hand held device,
 an electrical plug supported by the cord housing, said electrical plug connected to the insulated electrical cord and having blades for electrically connecting the insulated electrical cord and the external connector to the electrical wall socket,
 an adapter plate for placement between the cord housing and the electrical wall socket, the adapter plate including openings sized and shaped to fit about the blades of the electrical plug and about the socket openings of the electrical wall socket,
 a screw opening defined in the adapter plate for mounting the adapter plate to the electrical wall socket, and
 a rim formed on the adapter plate that fits with the cord housing to connect the cord housing to the adapter plate, so that the wall socket supports the adapter plate and the adapter plate supports the cord housing.

2. The electrical connector assembly of claim 1, wherein the adapter plate includes a perimeter rim, and the cord housing includes a perimeter rim that is supported by the perimeter rim of the adapter plate.

3. The electrical connector assembly of claim 2, and further including a lock mounted on the adapter plate that engages the perimeter rim of the cord housing for retaining the cord housing mounted on the adapter plate.

4. The electrical connector assembly of claim 3, wherein the lock mounted on the adapter olate includes a lock pin and a spring that urges the lock pin toward the perimeter rim of the cord housing, and the perimeter rim of the cord housing has a lock pin opening that receives the lock pin.

5. The electrical connector assembly of claim 2, wherein the perimeter rim of the cord housing extends continuously about the cord housing, and the perimeter rim of the adapter plate extends continuously about adapter plate and fits into the perimeter rim of the cord housing to seal the cord housing to the adapter plate.

6. The electrical connector assembly of claim 2, wherein the perimeter rim of the cord housing is continuous.

7. A wall mounted electrical connector assembly for mounting to a dual electrical wall socket having two electrical sockets spaced from each other, comprising
 an adapter plate defining socket openings shaped to fit about the openings of the electrical wall socket and a screw opening between the socket openings for mounting the adapter plate to the electrical wall socket,
 a cord housing including an electrical connector for charging a battery of a hand held device and electrical plug blades positioned for alignment with the socket openings, and
 the adapter plate and the cord housing each including a perimeter rim with the perimeter rims shaped to fit together with the adapter plate supporting the cord housing.

8. The wall mounted electrical connector of claim 7,
 and further including a lock that connects the perimeter rim of the housing to the perimeter rim of the adapter.

9. The wall mounted electrical connector of claim 8, wherein the lock comprises a lock assembly mounted to the adapter plate and a lock opening positioned at the perimeter rim of the cord housing.

10. The wall mounted electrical connector assembly of claim 9, wherein the lock assembly comprises a spring with a lock pin mounted on the spring, with the lock pin biased by the spring through the lock opening.

11. An electrical connector assembly for mounting to an electrical wall socket and for charging a battery of a device, comprising
 an adapter plate for mounting to the electrical wall socket, the adapter plate including a screw opening for mounting the adapter plate to the wall socket, and a perimeter rim,
 a housing including an electrical connector for charging a battery, the housing including a perimeter mating rim that is sized and shaped to mate with the perimeter rim of the adapter plate, and
 a lock for locking the housing to the adapter plate.

* * * * *